United States Patent
P R et al.

(10) Patent No.: US 10,088,998 B2
(45) Date of Patent: Oct. 2, 2018

(54) METHODS AND APPARATUS FOR DYNAMICALLY UPDATING DROP ZONE DATA DURING FLIGHT

(71) Applicant: HONEYWELL INTERNATIONAL INC., Morris Plains, NJ (US)

(72) Inventors: Sriram P R, Tamilnadu (IN); Emmanuel Letsu-Dake, Shakopee, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/416,512

(22) Filed: Jan. 26, 2017

(65) Prior Publication Data
US 2018/0210636 A1 Jul. 26, 2018

(51) Int. Cl.
*B64D 43/00* (2006.01)
*G06F 3/0484* (2013.01)

(52) U.S. Cl.
CPC ......... *G06F 3/04847* (2013.01); *B64D 43/00* (2013.01)

(58) Field of Classification Search
CPC .. G06F 3/04847; B64D 43/00; G08G 5/0091; G08G 5/0021; G08G 5/0034; G08G 5/0039; G08G 5/006; G01C 21/20
See application file for complete search history.

(56) References Cited

U.S. PATENT DOCUMENTS

| 4,121,246 A | 10/1978 | Fadden et al. | |
| 8,271,179 B2 * | 9/2012 | Parras | G05D 1/105 |
| | | | 701/102 |
| 8,538,605 B1 | 9/2013 | Riley | |
| 2009/0026319 A1 | 1/2009 | Strong | |
| 2014/0240147 A1 * | 8/2014 | Goda | B64D 1/16 |
| | | | 340/945 |
| 2017/0276486 A1 * | 9/2017 | Arneau | G01C 21/20 |

FOREIGN PATENT DOCUMENTS

| FR | 3030033 A1 * | 6/2016 | ........... G08G 5/0091 |
| WO | 2016096415 A1 | 6/2016 | |

OTHER PUBLICATIONS

Wright, Robert et al., "Precision Airdrop System," 18th AIAA Aerodynamic Decelerator Systems Technology Conference and Seminar, 2005.
Extended EP Search Report for Application No. 18153261.5 dated Jun. 6, 2018.
Wuest, Michael R., et al., "Precision Airdrop," Research and Technology Organization of Nato, vol. 24, Dec. 1, 2005.

* cited by examiner

*Primary Examiner* — Steven Lim
*Assistant Examiner* — Mancil Littlejohn, Jr.
(74) *Attorney, Agent, or Firm* — Lorenz & Kopf, LLP

(57) ABSTRACT

A method for computing drop zone data onboard an aircraft is provided. The method obtains, by a processor, current drop zone parameters for an air drop, during flight of the aircraft; receives, by the processor, changes to dynamic conditions associated with operation of the aircraft, wherein the dynamic conditions comprise at least one of wind speed, drop altitude, current temperature, angle of approach, aircraft speed, and number of stages of planned drop; calculates, by the processor, updated drop zone parameters, based on the current drop zone parameters and the changes to the dynamic conditions; and presents the updated drop zone parameters, via a display device.

14 Claims, 8 Drawing Sheets

METHODS AND APPARATUS FOR DYNAMICALLY UPDATING DROP ZONE DATA DURING FLIGHT

TECHNICAL FIELD

Embodiments of the subject matter described herein relate generally to providing drop zone data onboard an aircraft. More particularly, embodiments of the subject matter relate to dynamically updating drop zone data based on updated conditions during flight.

BACKGROUND

An airdrop is the act of dropping supplies, equipment, or personnel by parachute from an aircraft. Precision is a key metric for the planning and performance of airdrops from an aircraft. To ensure a successful airdrop, it is important for a pilot to be aware of the region and current conditions, and to have precise air drop location information. Aerial drop operations are often performed by pilots at locations under variable and changing conditions (e.g., inclement weather, low visibility).

Accordingly, it is desirable to provide additional drop zone data onboard the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for computing drop zone data onboard an aircraft. The method obtains, by a processor, current drop zone parameters for an air drop, during flight of the aircraft; receives, by the processor, changes to dynamic conditions associated with operation of the aircraft, wherein the dynamic conditions comprise at least one of wind speed, drop altitude, current temperature, angle of approach, aircraft speed, and number of stages of planned drop; calculates, by the processor, updated drop zone parameters, based on the current drop zone parameters and the changes to the dynamic conditions; and presents the updated drop zone parameters, via a display device.

Some embodiments of the present disclosure provide a system for computing drop zone data onboard an aircraft. The system includes: system memory; a display device, configured to present the drop zone data; and at least one processor, communicatively coupled to the system memory and the display device, the at least one processor configured to: obtain current drop zone parameters for an air drop, during flight of the aircraft; receive changes to dynamic conditions associated with operation of the aircraft, wherein the dynamic conditions comprise at least one of wind speed, drop altitude, current temperature, angle of approach, aircraft speed, and number of stages of planned drop; calculate updated drop zone parameters, based on the current drop zone parameters and the changes to the dynamic conditions; and present the updated drop zone parameters, via the display device.

Some embodiments of the present disclosure provide a non-transitory, computer-readable medium containing instructions thereon, which, when executed by a processor, perform a method. During flight, the method dynamically updates drop zone coordinates for an air drop, to generate updated drop zone coordinates; and presents the updated drop zone coordinates using graphical elements on a display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for dynamically updating drop zone parameters for an airdrop, during flight, such that the airdrop may be accomplished successfully under changing flight conditions. More specifically, the subject matter relates to dynamically receiving updated flight condition data, in real-time during flight, computing new drop zone data based on the updated flight condition data, and presenting the new drop zone data onboard the aircraft for use by a flight crew to perform the airdrop successfully.

Certain terminologies are used with regard to the various embodiments of the present disclosure. An airdrop is the act of dropping supplies, equipment, personnel, or the like, by parachute from an aircraft. Each airdrop is associated with a drop zone, which is the place where parachutists or parachuted supplies are targeted to land. A drop zone includes drop zone coordinates or parameters. Drop zone coordinate and parameters may include, without limitation: a leading edge of the drop zone, a trailing edge of the drop zone, a point of impact of the drop zone, an aerial release point associated with the drop zone, a time period from a current aircraft location to the aerial release point, and a time duration the aircraft is required to remain positioned over the drop zone.

Dynamic conditions are flight conditions or aircraft conditions that may change during flight or that continuously change during flight, and which affect drop zone parameters. In other words, drop zone parameters may need to be altered to achieve a successful airdrop when the dynamic conditions change. The dynamic conditions may include one or more of the following, without limitation: wind speed, drop altitude, current temperature, angle of approach, aircraft speed, and a number of stages of the planned drop (i.e., whether the airdrop is a single-stage airdrop or a multi-stage airdrop).

Figure 1:
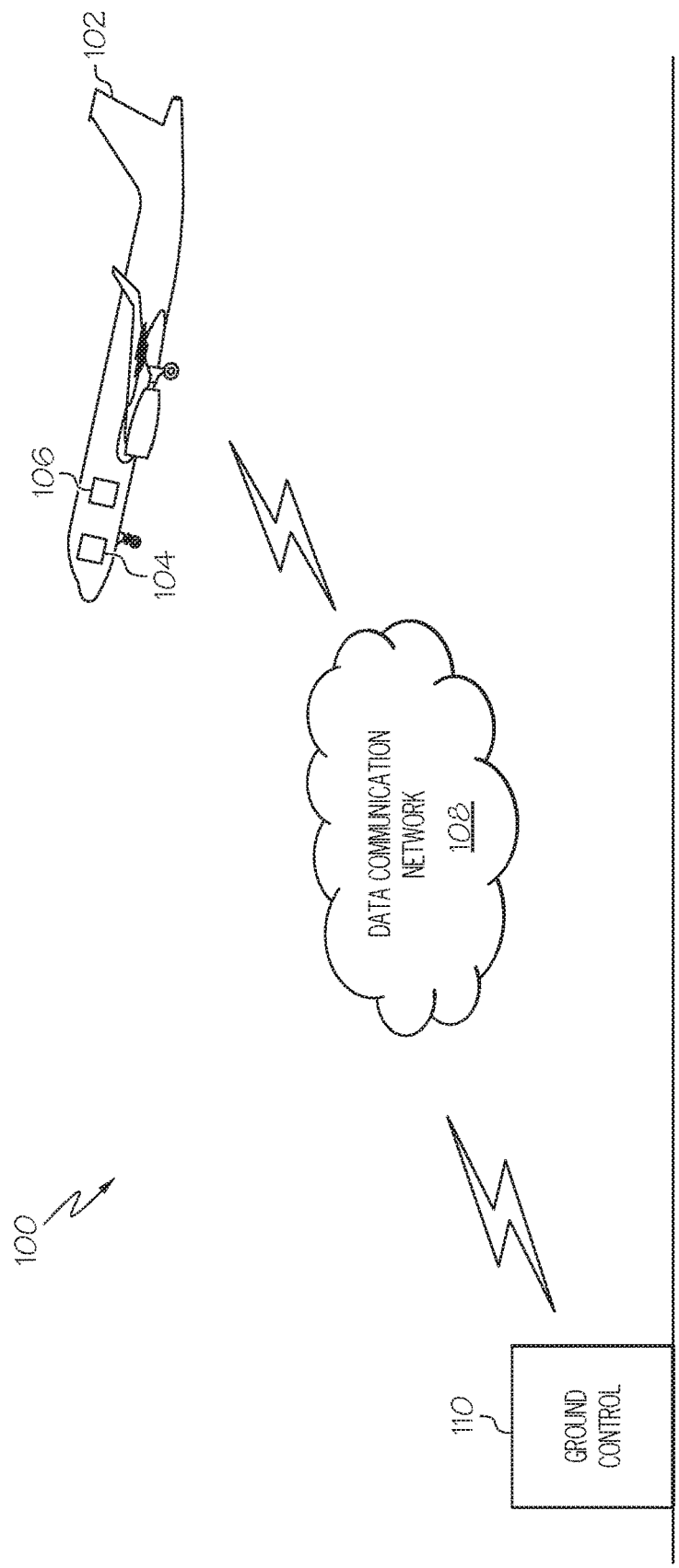
FIG. 1 is a diagram of a system for dynamically updating drop zone data, in accordance with the disclosed embodiments.

Turning now to the figures, FIG. 1 is a diagram of a drop zone updating system 100 for dynamically updating drop zone data, in accordance with the disclosed embodiments. The drop zone updating system 100 includes, without limitation, avionics systems 104 and a computing device 106, onboard an aircraft 102. The computing device 106 receives updated flight and aircraft condition data and dynamically computes drop zone coordinates or parameters based on the updated condition data. It should be appreciated that the computing device 106, the avionics systems 104, and any corresponding logical elements, individually or in combination, are exemplary means for performing a claimed function. Other embodiments of the drop zone updating system 100 may include additional or alternative elements and components, as desired for the particular application. For example, additional components such as displays and user input components may be employed without departing from the scope of the present disclosure.

The computing device 106 may be implemented by any computing device that includes at least one processor, some form of memory hardware, a user interface, and communication hardware. For example, the computing device 106 may be implemented using a personal computing device, such as a tablet computer, a laptop computer, a personal digital assistant (PDA), a smartphone, a smartwatch, or the like. In this scenario, the computing device 106 is capable of storing, maintaining, and executing an Electronic Flight Bag (EFB) application configured to receive updated condition data and dynamically calculates and presents updated drop zone coordinates or parameters during flight. In other embodiments, the computing device 106 may be implemented using a computer system onboard the aircraft 102 (e.g., one of the avionics systems 104 or a separate and distinct computer system), which is configured to determine and present an updated drop zone based on dynamically changing parameters.

The computing device 106 may also be implemented as an integrated avionics system 104 or device onboard the aircraft 102. The avionics systems 104 may be implemented as any electronics system integrated into the aircraft 102, and may include, without limitation, a flight management system (FMS), Automatic Dependent Surveillance-Broadcast (ADS-B) devices, flight control system (FCS) devices, navigation devices, weather devices, radar, brake systems, or the like.

The computing device 106 generally receives updated condition data from ground control 110, one or more of the avionics systems 104, controller-pilot data link communications (CPDLC), or the like. The computing device 106 is usually located onboard the aircraft 102, and the computing device 106 communicates with the one or more avionics systems 104 via wired and/or wireless communication connection. The computing device 106 and ground control 110 are generally disparately located, and the computing device 106 communicates with ground control 110 via a data communication network 108 and/or via communication mechanisms onboard the aircraft 102.

The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 106 obtains updated flight condition data and/or aircraft condition data associated with performance of an airdrop by the aircraft 102, from a user (e.g., user-entered parameters), the one or more avionics systems 104, and/or ground control 110. The computing device 106 then uses the received condition data to compute updated drop zone parameters, coordinates, and other airdrop data, and presents the updated drop zone data such that a user (e.g., a flight crew member) may alter airdrop procedures and actions based on the dynamically updated and presented drop zone data. The computing device 106 is configured to continuously and dynamically calculate and present updated drop zone data during flight.

In certain embodiments, the computing device 106 is implemented using a flight management system (FMS) onboard application, wherein the updated flight plan, including updated waypoints and updated drop zone parameters, are computed by and used by the FMS. In other embodiments, the computations of the updated flight plan (including updated waypoints and updated drop zone parameters) are performed by an electronic flight bag (EFB) application. When flight planning computations are completed by an EFB application executed by the computing device 106, a plan file is generated and is usually loaded into FMS through a wireless or wired network.

Figure 2:
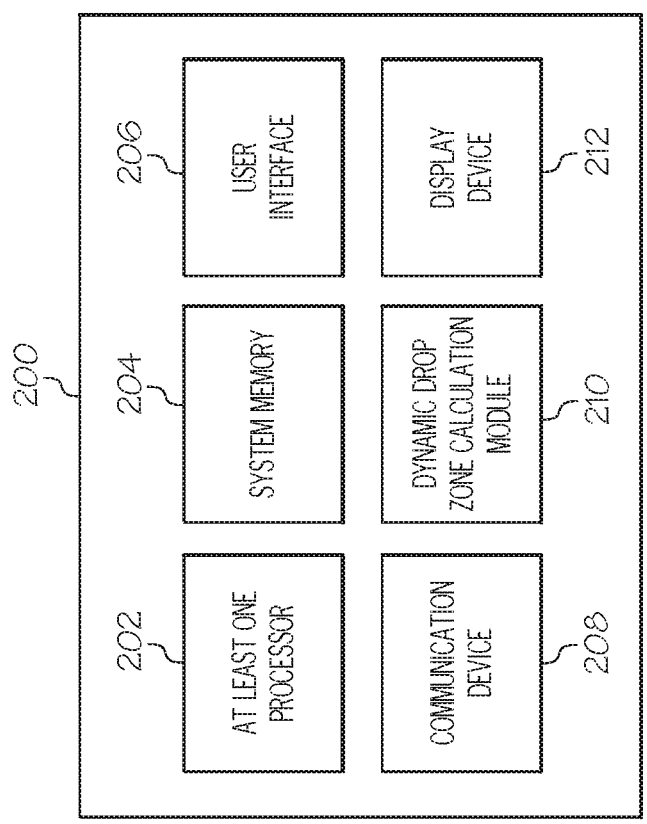
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 106 depicted in FIG. 1. In this regard, the computing device 200 shows certain elements and components of the computing device 106 in more detail.

The computing device generally includes, without limitation: at least one processor 202; system memory 204; a user interface 206; a communication device 208; a dynamic drop zone calculation module 210; and a display device 212. These elements and features of computing device 200 may be operatively associated with one another, coupled to one another, or otherwise configured to cooperate with one another as needed to support the desired functionality—in particular, dynamically updating drop zone parameters and coordinates, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the drop zone calculation and updating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with current drop zone parameters or coordinates for an airdrop, flight condition data, aircraft condition data, and performing calculations to update drop zone coordinates for the airdrop. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide user input flight condition data, aircraft condition data, user requests for updated drop zone data, and/or dynamically updated drop zone parameters, coordinates, or other drop zone data, during flight, as described herein.

In certain embodiments, the user interface 206 may include or cooperate with various features to allow a user to interact with the computing device 200 via graphical elements rendered on a display element (e.g., the display device 212). Accordingly, the user interface 206 may initiate the creation, maintenance, and presentation of a graphical user interface (GUI). In certain embodiments, the display device 212 implements touch-sensitive technology for purposes of interacting with the GUI. Thus, a user can manipulate the GUI by moving a cursor symbol rendered on the display device 212, or by physically interacting with the display device 212 itself for recognition and interpretation, via the user interface 206.

The communication device 208 is suitably configured to communicate data between the computing device 200 and ground control, and between the computing device 200 and one or more avionics systems onboard an aircraft. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: flight condition data, aircraft condition data, weather data, wind speed data, drop altitude data, temperature data, angle of approach data, aircraft speed data, whether an upcoming airdrop is a single-stage airdrop or a multi-stage airdrop, and other data compatible with the computing device 200. Data provided by the communication device 208 may include, without limitation: requests for updated flight condition data, updated aircraft condition data, and the like.

The dynamic drop zone calculation module 210 is suitably configured to receive updated flight condition data and aircraft condition data, and to compute updated drop zone coordinates and other applicable drop zone parameters based on the updates to dynamic condition data. Updated dynamic condition data may be received from ground control (via the communication device 208) or as user-entered data parameters (via the user interface 206). Such updated flight condition data and aircraft condition data may include, without limitation: wind speed, drop altitude, current temperature, angle of approach, aircraft speed, and a number of stages of the planned drop (i.e., whether the airdrop is a single-stage airdrop or a multi-stage airdrop).

The updates and changes to dynamic condition data are used by the dynamic drop zone calculation module 210 to calculate updated drop zone coordinates and parameters. Updated drop zone coordinates and parameters may include, without limitation: an updated flight plan (lateral and vertical), including CARP pattern waypoints; an updated drop zone, including an updated leading edge, an updated trailing edge, and an updated aerial release point; an updated point of impact; an updated drop altitude; and an updated drop speed. Updated drop zone coordinates and parameters are depicted by the display device 212.

In practice, the dynamic drop zone calculation module 210 may be implemented with (or cooperate with) the at least one processor 202 to perform at least some of the functions and operations described in more detail herein. In this regard, the dynamic drop zone calculation module 210 may be realized as suitably written processing logic, application program code, or the like.

Figure 3:
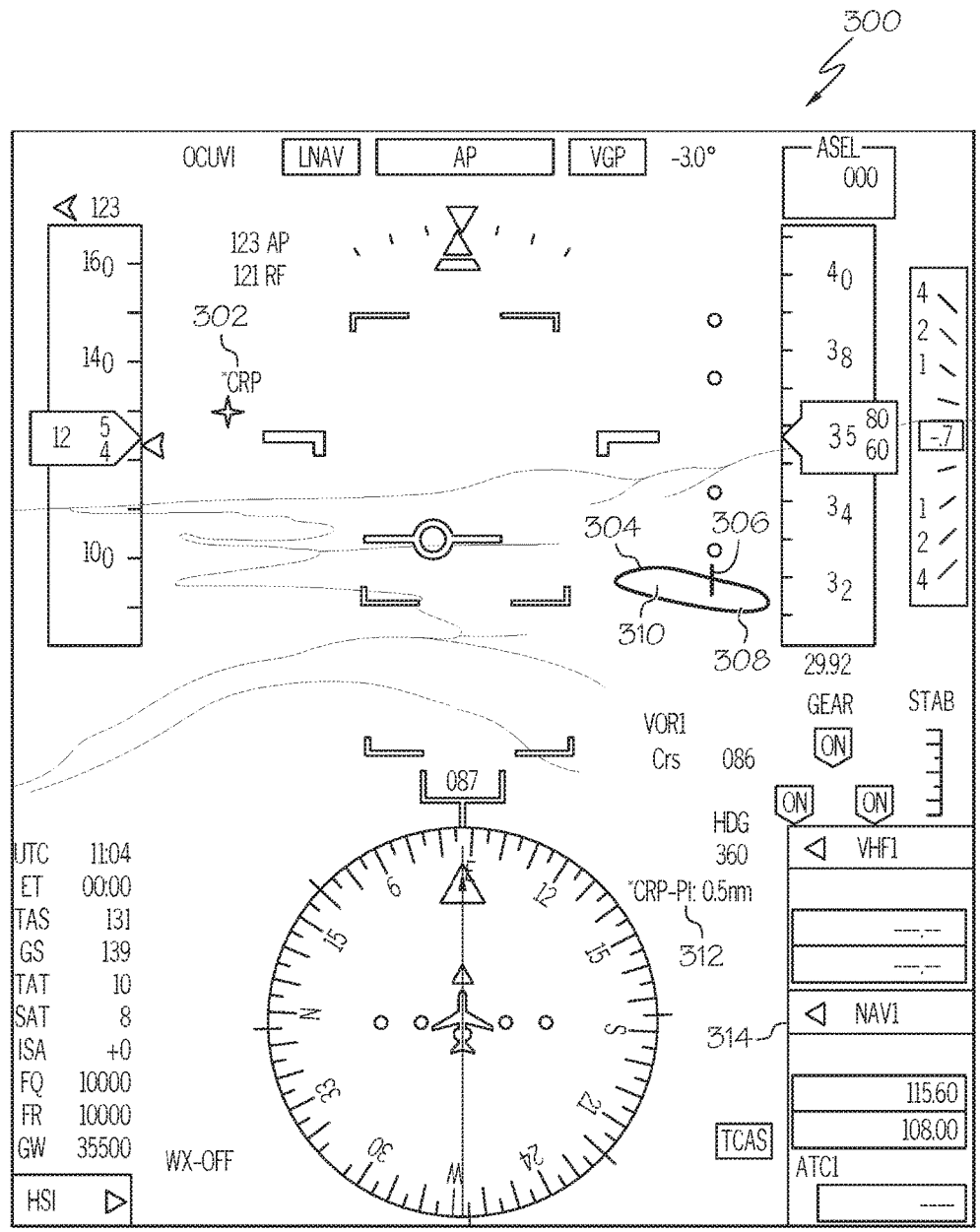
FIG. 3 is a diagram of a synthetic vision display, in accordance with the disclosed embodiments.
Figure 5:
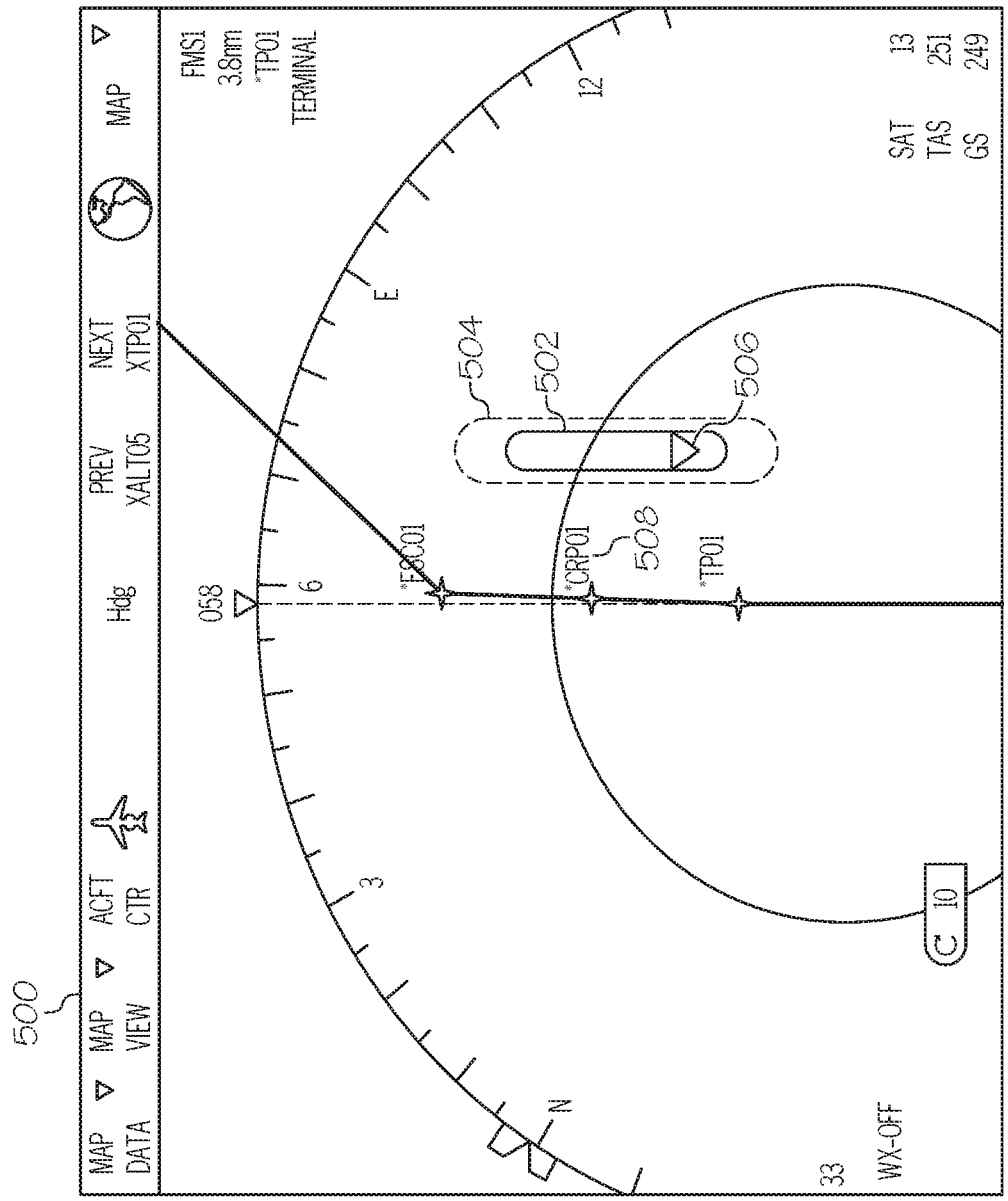
FIG. 5 is a diagram of a lateral map display, in accordance with the disclosed embodiments.
Figure 6:
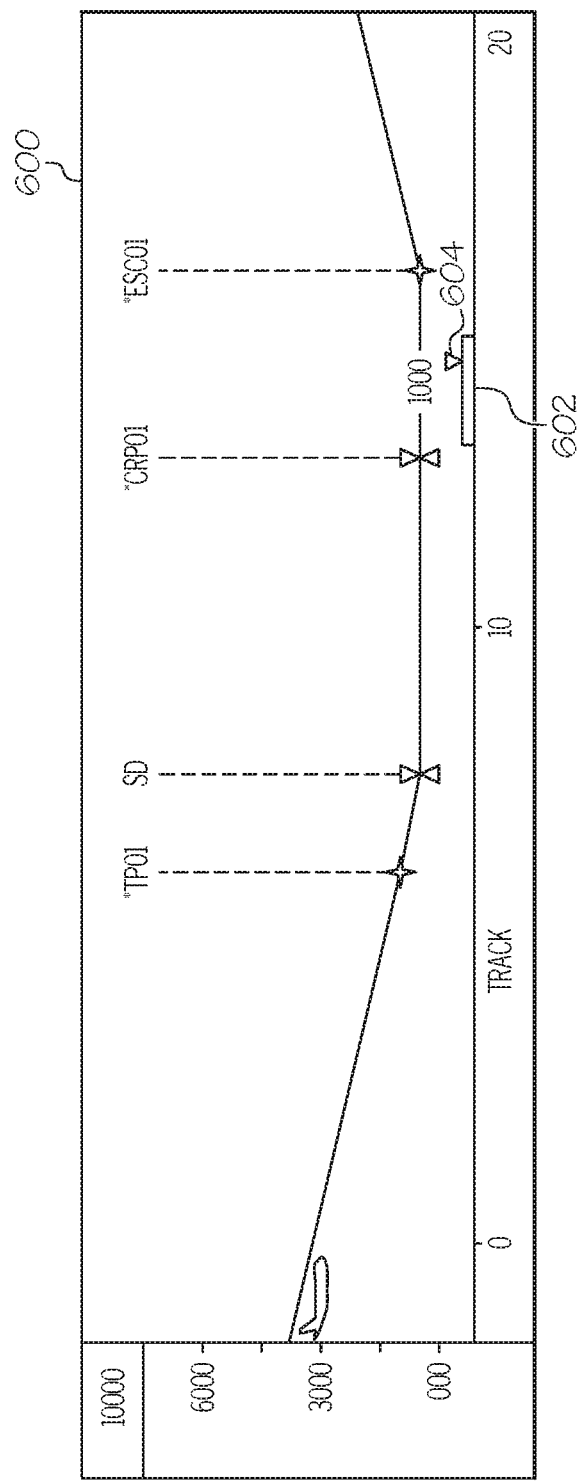
FIG. 6 is a diagram of a vertical situation display (VSD), in accordance with the disclosed embodiments.

The display device 212 is configured to display various icons, text, and/or graphical elements associated with a drop zone for one or more airdrops, including flight condition data, aircraft condition data, drop zone coordinates, drop zone parameter data, or the like. In an exemplary embodiment, the display device 212 is communicatively coupled to the user interface 206, and the display device 212 and the user interface 206 are communicatively coupled to the at least one processor 202. The at least one processor 202, the user interface 206, and the display device 212 are cooperatively configured to display, render, or otherwise convey one or more graphical representations or images associated with drop zone parameter data on the display device 212, as described in greater detail below. In an exemplary embodiment, the display device 212 is realized as an electronic display. In some embodiments, the computing device 200 is an integrated computer system onboard an aircraft, and the display device 212 is located within a cockpit of the aircraft, and is thus implemented as an aircraft display. In other embodiments, the display device 212 is implemented as a display screen of a standalone, personal computing device (e.g., laptop computer, tablet computer). Embodiments of the display device 212 may be implemented using at least one of a computing device display, a synthetic vision system display as shown in FIG. 3, a navigation display, a lateral map display as shown in FIG. 5, a primary flight display (PFD), a flight management system (FMS) display, and a vertical situation display (VSD) as shown in FIG. 6. It will be appreciated that although the display device 212 may be implemented using a single display, certain embodiments may use additional displays (i.e., a plurality of displays) to accomplish the functionality of the display device 212 described herein.

FIG. 3 is a diagram of a synthetic vision display 300, in accordance with the disclosed embodiments. The synthetic vision display 300 is part of a synthetic vision system for an aircraft, which is a computer-mediated reality system for aerial vehicles used to provide situational awareness to flight crew members onboard the aircraft. The synthetic vision display 300 presents a visual representation of drop zone data applicable to an airdrop. An airdrop is the act of dropping supplies, equipment, personnel, or the like, by parachute from the aircraft. Each airdrop is associated with a drop zone 310, which is the place where the parachuted supplies and/or parachuted people are targeted to land. The drop zone 310 includes drop zone coordinates or parameters. Drop zone coordinates and parameters may include, without limitation: a leading edge 308 of the drop zone, a trailing edge 304 of the drop zone, a point of impact 306 of the drop zone, an aerial release point 302 associated with the drop zone, a time period 312 from a current aircraft location to the aerial release point 302, and a time duration 314 the aircraft is required to remain positioned over the drop zone 310 to perform the airdrop successfully.

The leading edge 308 of a drop zone is start point of a rectangular drop zone, from the direction at which the aircraft enters the drop zone. The trailing edge 304 of a drop zone is is the end point of the rectangular drop zone. A point of impact 306 is the location inside the drop zone 310 at which the parachuted people and/or supplies are calculated to impact the ground. The aerial release point 302 is the aircraft location at which the aircraft is calculated to release the parachuted people and/or supplies, in order to land in the drop zone 310.

It should be noted that not all drop zones are rectangular, and that the type of drop zone is based on the mission. The rectangular drop zone is referenced for purposes of this embodiment, as it is the most commonly used type of drop zone. However, it should be appreciated that other embodiments of the present disclosure may be used for other types of drop zones as well.

When an airdrop is scheduled for the aircraft, the drop zone parameters are computed. Then, when the aircraft travels within proximity of the drop zone 310, the synthetic vision display 300 presents the drop zone parameters to assist the flight crew to perform the airdrop. However, when specific, dynamic conditions change during the course of the flight, the pre-computed drop zone parameters may no longer provide the aircraft with accurate information to perform the airdrop. The drop zone parameters are dynamically re-computed, in real-time and during the flight, such that the airdrop may be performed under the changed dynamic conditions. In this situation, the drop zone limits (e.g., the trailing edge 304 and the leading edge 308 of the drop zone) and flight plan waypoints are re-computed, to produce an updated drop zone and updated waypoints, which may be different from the originally computed drop zone and waypoints.

Figure 4:
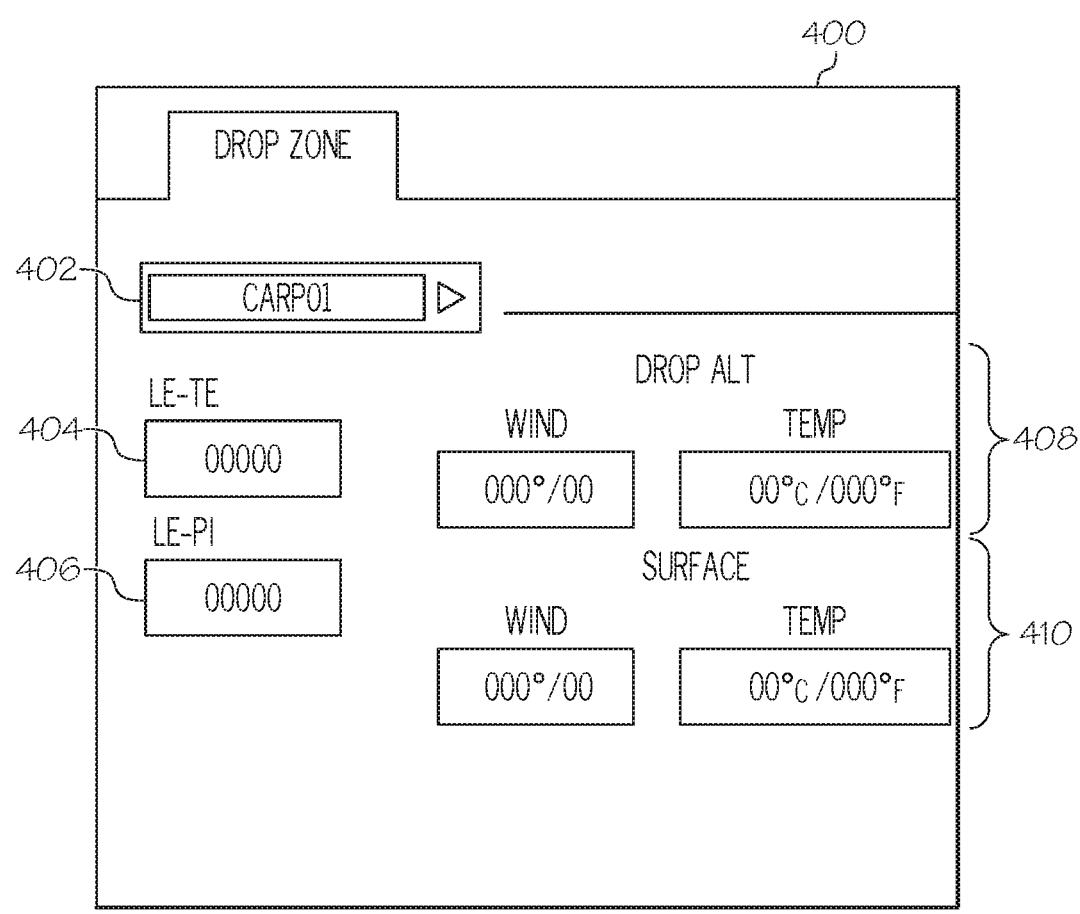
FIG. 4 is a diagram of a user interface for updating drop zone data, in accordance with the disclosed embodiments.

FIG. 4 is a diagram of a graphical user interface (GUI) 400 for updating drop zone data, in accordance with the disclosed embodiments. The GUI 400 may be presented by a computing device (see reference 106 of FIG. 1 and reference 200 of FIG. 2) or a display communicatively coupled to the computing device. The GUI 400 is a sample of a user interface which may be used by flight crew members to enter updated or changed flight conditions associated with calculating drop zone parameters. The computing device receives the user-entered flight conditions, via the GUI 400, during flight. The user-entered data is then used by the computing device to calculate updated drop zone parameters, including an updated aerial release point, an updated point of impact, an updated leading edge of drop zone, and an updated trailing edge of drop zone.

As shown, the GUI 400 includes data entry fields for wind speed and temperature, which are dynamic conditions associated with the calculations for drop zone parameters. Other dynamic conditions may include drop altitude, angle of approach, aircraft speed, and a number of stages of the planned drop. The GUI 400 shown in FIG. 4 is one exemplary embodiment of the nine pages of the Computed Air Release Point (CARP) pattern that may be displayed onboard an aircraft. As shown, the GUI 400 includes the following parameters: the CARP pattern number 402; the LE-TE distance 404; the LE-PI distance 406; drop altitude parameters 408; and surface parameters 410.

The CARP pattern number 402 is shown as "CARP01". There may be up to nine (9) CARP patterns in a flight plan, and the numbers of each are usually provided in order, from CARP01-CARP09. When a flight crew member wishes to change the values of CARP pattern 2, the flight crew member selects the CARP02 page and modifies the data. The LE-TE distance 404 is the distance between a leading edge of the drop zone to a trailing edge of the drop zone. The LE-PI distance 406 is the distance from a leading edge of the drop zone to the point of impact on the drop zone. Here, the system computes the effective distance where the drop can be performed (e.g., from the point of impact to the trailing edge).

The drop altitude parameters 408 include the wind and temperature at the altitude from which the airdrop is going to be performed. The surface parameters 410 include surface wind or temperature information, which is generally entered into the system by the flight crew. Here, the drop altitude parameters 408 and the surface parameters 410 are used to compute the drift for the airdrop operation.

FIG. 5 is a diagram of a lateral map display 500, in accordance with the disclosed embodiments. It should be noted that the lateral map display 500 may be one exemplary embodiment of the display device 212 depicted in FIG. 2. In this regard, the lateral map display 500 shows certain elements and components of the display device 212 in more detail. The lateral map display 500 is generally integrated into an aircraft cockpit or flight deck, and is positioned for viewing by flight crew members onboard the aircraft.

This embodiment of the lateral map display 500 depicts a flight plan that includes a plurality of waypoints, and a drop zone 502 that has been pre-calculated prior to flight. The lateral map display 500 also includes a point of impact 506 and a release point 508 associated with the drop zone 502. The flight plan includes a set of waypoints like the Turn point (*TPxx), *SDxx (e.g., a slow down point, which is a pseudo-waypoint, as depicted in FIG. 6), a CARP waypoint (*CRPxx), and an Escape waypoint (*ESCxx). These waypoints, along with the drop zone, are constructed with data entered into the system by the flight crew (i.e., via data entry). These conditions are updated when the aircraft is flying close to the CARP pattern, and are "frozen" (i.e., maintain the same value continuously) at a point in time ten seconds from the *CRPxx waypoint.

The choice of the flightplan with respect to the drop is in accordance with the drift computed. If the drift computed provides a flightplan (FPLN) to the right of the drop zone 502, then the FPLN is shown on the lateral map display 500 on the right side of the drop zone 502. Similarly, if the drift computed provides a flightplan (FPLN) to the left of the drop zone 502, then the FPLN is shown on the lateral map display 500 on the left side of the drop zone 502. Additionally, an airdrop might include a single run or multiple runs. During multiple runs, the aircraft is flown back a return path from *TPxx waypoint to the *ESCxx waypoint. For the return path, the flight crew has a choice to select Left (L) or Right (R) turn. The choice of turn is based on the geometry of the drop region and ease of the flight crew.

The drop zone 502 shown is the "active" drop zone that has been calculated and planned prior to flight. Mission planning is completed prior to flight, and updates are also made while flying to the CARP pattern. This particular embodiment is a drop zone 502 for a low altitude drop (e.g., 10 knots (kts)/500 feet (ft) AGL). The lateral map display 500 also shows an updated drop zone 504, applicable for an increased wind speed and/or a higher drop altitude (e.g., 40 kts/4000 ft AGL). The updated drop zone 504 is a "pending" drop zone, which is not the currently selected and active drop zone (i.e., drop zone 502). In this particular example, the original drop zone 502, including the point of impact 506 and point of release 508, has been predetermined and selected, and the drop zone 502 is included in the flight plan. During flight, the drop zone updating system (see reference 100 of FIG. 1) receives updates or changes to dynamic conditions associated with calculating the drop zone 502. In response to receiving the updated dynamic condition data, the drop zone updating system re-calculates a more appropriate, updated drop zone 504, based on the dynamic condition data. In the embodiment shown, the lateral map display 500 presents the updated drop zone 504 concurrently with the original drop zone 502. Based on activation by the flight crew, the drop zone 502 or the updated drop zone 504 is selected. If the flight crew does not activate the drop zone 502 or the updated drop zone 504, then a drop zone selection remains in a pending status.

FIG. 6 is a diagram of a vertical situation display (VSD) 600, in accordance with the disclosed embodiments. It should be noted that the VSD 600 may be one exemplary embodiment of the display device 212 depicted in FIG. 2. In this regard, the VSD 600 shows certain elements and components of the display device 212 in more detail. This embodiment of the VSD 600 depicts a flight plan that includes a plurality of waypoints, and a drop zone 602 with a point of impact 604 associated with the drop zone 602.

As shown, the VSD 600 depicts the vertical profile of the drop pattern. Airdrop missions could be a low altitude mission or a high altitude mission. The exemplary embodiment of FIG. 6 illustrates a low altitude mission. Thus, the aircraft is descending from a high altitude to the drop zone. The aircraft reaches the drop altitude at *SDxx waypoint (i.e., the slow down point) from which the aircraft decelerates its speed and reaches the desired speed by the time the aircraft reaches the *CRPxx waypoint, where the mission commences. The drop ends by *ESCxx waypoint. During drop, it is very important for the aircraft to remain wings-level at a fixed altitude to improve the accuracy of the drop, and thus the aircraft flies a level segment from *SDxx to *ESCxx. Once the mission is completed, the aircraft climbs back up to its cruise altitude.

The drop zone 602 shown is an "active" drop zone that has been selected for current use, and may be a drop zone that has been pre-calculated prior to flight or an updated drop zone that has been re-calculated and modified during flight. During flight, the drop zone updating system (see reference 100 of FIG. 1) receives updates or changes to dynamic conditions associated with calculating the drop zone 602. In response to receiving the updated dynamic condition data, the drop zone updating system re-calculates a more appropriate, updated drop zone 602 (including an updated point of impact 604), based on the dynamic condition data. In the embodiment shown, the VSD 600 presents the updated drop zone 602 using a vertical display, for interpretation and use by the flight crew.

Figure 7:
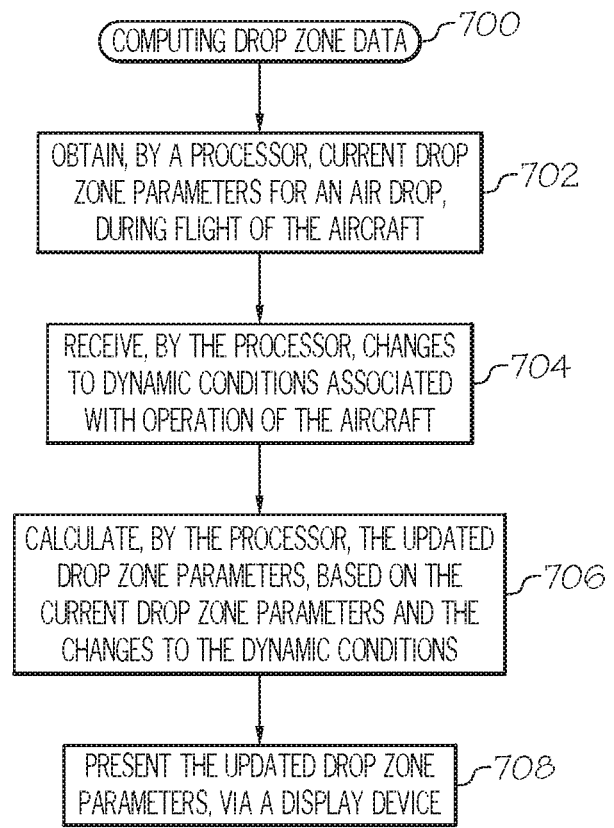
FIG. 7 is a flow chart that illustrates an embodiment of a process for computing drop zone data.

FIG. 7 is a flow chart that illustrates an embodiment of a process 700 for computing drop zone data. The various tasks performed in connection with process 700 may be performed by software, hardware, firmware, or any combination thereof. For illustrative purposes, the following description of process 700 may refer to elements mentioned above in connection with FIGS. 1-6. In practice, portions of process 700 may be performed by different elements of the described system, e.g., a computing device, one or more avionics systems or devices, or a display device. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. Moreover, one or more of the tasks shown in FIG. 7 could be omitted from an embodiment of the process 700 as long as the intended overall functionality remains intact.

First, the process 700 obtains, by a processor, current drop zone parameters for an air drop, during flight of the aircraft (step 702). Current drop zone parameters generally include an aerial release point, a point of impact, a leading edge of a drop zone, and a trailing edge of a drop zone. Current drop zone parameters may be obtained from a flight management system (FMS), as user input parameters, as data communication transmissions from ground control, or the like. In certain embodiments, the process 700 obtains current drop zone parameters by establishing, by the processor, a communication connection to a flight management system (FMS) onboard the aircraft; and receiving the current drop zone parameters via the communication connection. In some embodiments, the process 700 obtains current drop zone parameters by receiving user input data associated with the air drop, the user input data comprising the current drop zone parameters.

The process 700 also receives, by the processor, changes to dynamic conditions associated with operation of the aircraft (step 704). Dynamic conditions are flight conditions or aircraft conditions that may change during flight or that continuously change during flight, and which affect drop zone parameters. In other words, drop zone parameters may need to be altered to achieve a successful airdrop when the dynamic conditions change. The dynamic conditions may include one or more of the following, without limitation: wind speed, drop altitude, current temperature, angle of approach, aircraft speed, and a number of stages of the planned drop (i.e., whether the airdrop is a single-stage airdrop or a multi-stage airdrop).

In some embodiments, the process 700 receives changes to dynamic conditions automatically, via sensors and/or avionics systems onboard the aircraft. For example, the process 700 can receive changes to dynamic conditions by establishing a communication connection from the processor to a flight management system (FMS) onboard the aircraft; and continuously obtaining, via the FMS, sensor-detected parameters associated with operation of the aircraft; wherein the updated drop zone parameters are calculated using the sensor-detected parameters. In other embodiments, however, the process 700 receives changes to dynamic conditions as user input. Here, the process 700 may receive a user-entered data parameters including current values for, and changes to, each of the dynamic conditions via a user interface, wherein the updated drop zone parameters are calculated using the user input parameters.

Next, the process 700 calculates, by the processor, the updated drop zone parameters, based on the current drop zone parameters and the changes to dynamic conditions (step 706). One suitable methodology for calculating the updated drop zone parameters is described below with reference to FIG. 8. Here, the process 700 calculates an updated aerial release point, an updated point of impact, an updated leading edge of drop zone, and an updated trailing edge of drop zone. The process 700 also calculates an updated airdrop pattern. The term "pattern" refers to all the waypoints in the flightplan which are present for the airdrop mission (e.g., waypoints through *TPxx to *ESCxx waypoint, as shown in FIGS. 5-6).

The process 700 then presents the updates drop zone parameters, via a display device (step 708). Updated drop zone parameters may include, without limitation an updated aerial release point, an updated point of impact, an updated leading edge of drop zone, and an updated trailing edge of drop zone. In certain embodiments, the process 700 presents the updated drop zone parameters. In other embodiments, the process 700 presents current drop zone parameters concurrently with the updated drop zone parameters, as shown in FIG. 5. The current and/or updated drop zone parameters are presented via a display device, which may be implemented using at least one of a computing device display, a synthetic vision system display, a navigation display, a lateral map display, a primary flight display (PFD), a flight management system (FMS) display, and a vertical situation display (VSD).

Figure 8:
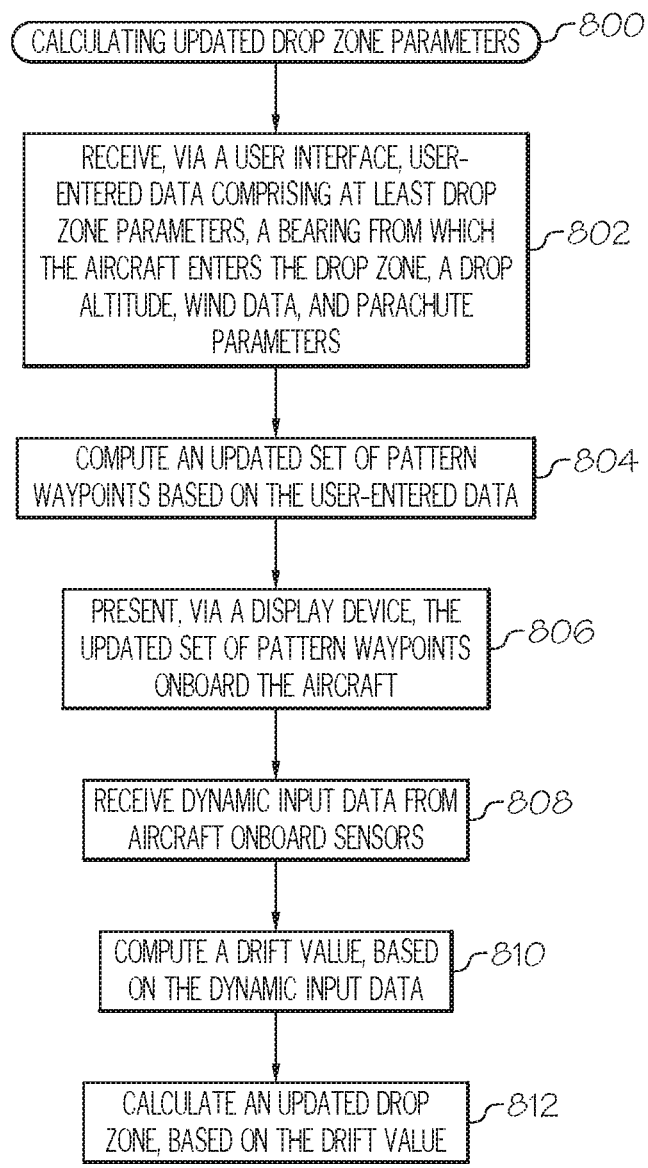
FIG. 8 is a flow chart that illustrates an embodiment of a process for calculating updated drop zone parameters.

FIG. 8 is a flow chart that illustrates an embodiment of a process 800 for calculating updated drop zone parameters. It should be appreciated that the process 800 described in FIG. 8 represents one embodiment of step 706 described above in the discussion of FIG. 7, including additional detail. First, the process 800 receives, via a user interface, user-entered data comprising at least drop zone parameters, a bearing from which the aircraft enters the drop zone, a drop altitude, wind data, and parachute parameters (step 802). Here, flight crew members provide the drop zone parameters, RUN incrs (e.g., bearing from which the aircraft approaches the drop zone), the drop altitude, the wind data, and the parachute parameters via data entry into the avionics system or computing device (see FIG. 2) executing the process 800.

Next, the process 800 computes an updated set of pattern waypoints based on the user-entered data (step 804). After computing the updated set of pattern waypoints, the process 800 presents the updated set of pattern waypoints via a display device onboard the aircraft (step 806). Here, the process 800 computes the pattern waypoints based on the user-entered data parameters and displays it to the pilot. This flight-planning step may be performed using a cockpit system, such as a flight management system (FMS) or a flight control system (FCS), and depicted on displays or on a handheld electronic flight bag (EFB) device.

The process 800 also receives dynamic input data from aircraft onboard sensors (step 808). The dynamic input data may include, without limitation: wind data (e.g., drop altitude wind, surface winds), temperature variations, aircraft speed, or the like. After receiving the dynamic input data (step 808), the process 800 then computes a drift value, based on the dynamic input data (step 810). Drift is the lateral distance in magnitude and angle from the point of impact, and indicates a percentage change in conditions for the aircraft to perform an airdrop at the drop zone.

The process 800 then calculates an updated drop zone, based on the drift value (step 812). Here, based on the percent change in conditions indicated by the calculated amount of drift, a threshold increase in drop zone dimensions is computed. The increased drop zone dimensions produces a new and updated drop zone, which may be larger than the original drop zone. The updated drop zone is presented onboard the aircraft via a display device.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for computing drop zone data onboard an aircraft, the method comprising:
    obtaining, by a processor, current drop zone parameters for an air drop, during flight of the aircraft, wherein the current drop zone parameters comprise a current leading edge of a drop zone for the air drop, a trailing edge of the drop zone, a point of impact of the drop zone, an aerial release point associated with the drop zone, a time period from a current aircraft location to the aerial release point, and a time duration the aircraft is required to remain positioned over the drop zone to perform the air drop;
    receiving, via a user interface communicatively coupled to the processor, user-entered changes to dynamic conditions associated with operation of the aircraft, wherein the dynamic conditions comprise at least one of wind speed, drop altitude, current temperature, angle of approach, aircraft speed, and number of stages of planned drop;
    computing an updated set of pattern waypoints, based on the user-entered changes, by the processor;
    receiving dynamic input data from aircraft onboard sensors, by the processor, the dynamic input data comprising drop altitude wind data, surface wind data, temperature data, and aircraft speed;
    computing a drift value, based on the current drop zone parameters and the dynamic input data, by the processor, the drift value comprising a lateral distance in magnitude and angle from the point of impact, the lateral distance indicating a percentage change in conditions for the aircraft to perform the air drop;
    calculating, by the processor, updated drop zone parameters, based on the drift value, wherein the updated drop zone parameters comprise an updated aerial release point, an updated point of impact, an updated leading edge of the drop zone, and an updated trailing edge of the drop zone; and
    presenting graphical elements and text representative of the updated drop zone parameters, via an aircraft onboard synthetic vision display comprising a computer-mediated reality system for aerial vehicles used to provide situational awareness data onboard the aircraft.

2. The method of claim 1, wherein receiving the changes to dynamic conditions further comprises:
establishing a communication connection from the processor to a flight management system (FMS) onboard the aircraft; and
continuously obtaining, via the FMS, sensor-detected parameters associated with operation of the aircraft; and
wherein the updated drop zone parameters are calculated using the sensor-detected parameters.

3. The method of claim 1, wherein receiving the changes to dynamic conditions further comprises receiving user input parameters comprising the changes to the dynamic conditions, via a user interface communicatively coupled to the processor; and
wherein the updated drop zone parameters are calculated using the user input parameters.

4. The method of claim 1, wherein presenting the updated drop zone parameters further comprises concurrently presenting the current drop zone parameters and the updated drop zone parameters, via the aircraft onboard synthetic vision display.

5. The method of claim 1, wherein calculating the updated drop zone parameters further comprises computing an updated aerial release point, an updated point of impact, an updated leading edge of drop zone, and an updated trailing edge of drop zone; and
wherein presenting the updated drop zone parameters further comprises presenting the updated aerial release point, the updated point of impact, the updated leading edge of drop zone, and the updated trailing edge of drop zone, via the aircraft onboard synthetic vision display.

6. The method of claim 1, wherein obtaining the current drop zone parameters for the air drop further comprises:
establishing, by the processor, a communication connection to a flight management system (FMS) onboard the aircraft; and
receiving the current drop zone parameters via the communication connection.

7. The method of claim 1, wherein obtaining the current drop zone parameters for the air drop further comprises receiving user input data associated with the air drop, the user input data comprising the current drop zone parameters.

8. A system for computing drop zone data onboard an aircraft, the system comprising:
system memory;
a lateral map display device integrated into the aircraft, the lateral map display configured to present graphical elements and text representative of drop zone data;
a user interface configured to receive user input changes to dynamic conditions associated with operation of the aircraft; and
at least one processor, communicatively coupled to the system memory, the user interface, and the lateral map display, the at least one processor configured to:
obtain current drop zone parameters for an air drop, during flight of the aircraft, wherein the current drop zone parameters comprise a current leading edge of a drop zone for the air drop, a trailing edge of the drop zone, a point of impact of the drop zone, an aerial release point associated with the drop zone, a time period from a current aircraft location to the aerial release point, and a time duration the aircraft is required to remain positioned over the drop zone to perform the air drop;
receive changes to the dynamic conditions associated with operation of the aircraft, wherein the dynamic conditions comprise at least one of wind speed, drop altitude, current temperature, angle of approach, aircraft speed, and number of stages of planned drop;
compute an updated set of pattern waypoints, based on the user-entered changes;
receive dynamic input data from aircraft onboard sensors, the dynamic input data comprising drop altitude wind data, surface wind data, temperature data, and aircraft speed;
compute a drift value, based on the current drop zone parameters and the dynamic input data, the drift value comprising a lateral distance in magnitude and angle from the point of impact, the lateral distance indicating a percentage change in conditions for the aircraft to perform the air drop;
calculate updated drop zone parameters, based on the drift value, wherein the updated drop zone parameters comprise an updated aerial release point, an updated point of impact, an updated leading edge of the drop zone, and an updated trailing edge of the drop zone; and
present graphical elements and text representative of the updated drop zone parameters, via the lateral map display device onboard the aircraft.

9. The system of claim 8, wherein the at least one processor is configured to receive changes to the dynamic conditions, by:
establishing a communication connection from the at least one processor to a flight management system (FMS) onboard the aircraft; and
continuously obtaining, via the FMS, sensor-detected parameters associated with operation of the aircraft;
wherein the updated drop zone parameters are calculated using the sensor-detected parameters.

10. The system of claim 8, wherein the at least one processor is configured to present the updated drop zone parameters by concurrently presenting the current drop zone parameters and the updated drop zone parameters, via the display device.

11. The system of claim 8, wherein the at least one processor is configured to obtain the current drop zone parameters by:
establishing, by the processor, a communication connection to a flight management system (FMS) onboard the aircraft; and
receiving the current drop zone parameters via the communication connection.

12. The system of claim 8, wherein the at least one processor is configured to obtain the current drop zone parameters by receiving user input data associated with the air drop, the user input data comprising the current drop zone parameters.

13. A non-transitory, computer-readable medium containing instructions thereon, which, when executed by a processor, perform a method comprising:
during flight, dynamically updating drop zone coordinates for an air drop, to generate updated drop zone coordinates, by:
receiving, via a user interface communicatively coupled to the processor, user-entered changes to dynamic conditions associated with operation of the aircraft, wherein the dynamic conditions comprise at least one of wind speed, drop altitude, current temperature, angle of approach, aircraft speed, and number of stages of planned drop;

computing an updated set of pattern waypoints, based on the user-entered changes, by the processor;

receiving dynamic input data from aircraft onboard sensors, by the processor, the dynamic input data comprising drop altitude wind data, surface wind data, temperature data, and aircraft speed;

computing a drift value, based on the current drop zone parameters and the dynamic input data, by the processor, the draft value comprising a lateral distance in magnitude and angle from the point of impact, the lateral distance indicating a percentage change in conditions for the aircraft to perform the air drop;

calculating, by the processor, updated drop zone parameters, based on the drift value, wherein the updated drop zone parameters comprise an updated aerial release point, an updated point of impact, an updated leading edge of the drop zone, and an updated trailing edge of the drop zone; and presenting the updated drop zone coordinates using graphical elements and text on a Vertical Situation Display (VSD) onboard the aircraft, wherein the VSD depicts a vertical profile of a flight plan including the updated set of pattern waypoints and the updated drop zone with the updated point of impact.

14. The non-transitory, computer-readable medium of claim 13, wherein receiving the changes to dynamic conditions further comprises:

establishing a communication connection from the processor to a flight management system (FMS) onboard the aircraft; and continuously obtaining, via the FMS, sensor-detected parameters associated with operation of the aircraft; and wherein the updated drop zone coordinates are calculated using the sensor-detected parameters.

* * * * *